United States Patent
Tsai et al.

(10) Patent No.: US 9,075,587 B2
(45) Date of Patent: Jul. 7, 2015

(54) INDUCTION TYPE POWER SUPPLY SYSTEM WITH SYNCHRONOUS RECTIFICATION CONTROL FOR DATA TRANSMISSION

(75) Inventors: Ming-Chiu Tsai, New Taipei (TW); Chi-Che Chan, New Taipei (TW)

(73) Assignee: Fu Da Tong Technology Co., Ltd., Zhonghe Dist., New Taipei (TW)

( * ) Notice: Subject to any disclaimer, the term of this patent is extended or adjusted under 35 U.S.C. 154(b) by 538 days.

(21) Appl. No.: 13/541,090

(22) Filed: Jul. 3, 2012

(65) Prior Publication Data
US 2012/0272076 A1    Oct. 25, 2012

(51) Int. Cl.
| | |
|---|---|
| H01F 27/42 | (2006.01) |
| H01F 37/00 | (2006.01) |
| H01F 38/00 | (2006.01) |
| G06F 1/26 | (2006.01) |
| H02J 5/00 | (2006.01) |
| H02M 3/335 | (2006.01) |
| H04B 5/00 | (2006.01) |

(52) U.S. Cl.
CPC *G06F 1/26* (2013.01); *G06F 1/266* (2013.01); *H02J 5/005* (2013.01); *H02M 3/33576* (2013.01); *H04B 5/0037* (2013.01); *H04B 5/0081* (2013.01)

(58) Field of Classification Search
CPC .......... H02J 5/005; H02J 7/025; H02J 17/00; H01F 38/14; B60L 11/182; H03C 1/00; H04B 5/0037
USPC ........ 307/66, 64, 149, 80, 9.1, 10.2; 320/160; 323/355, 304; 363/148, 157; 455/419, 455/552.1, 404.2
See application file for complete search history.

(56) References Cited

U.S. PATENT DOCUMENTS

| | | | |
|---|---|---|---|
| 4,561,443 | A | 12/1985 | Hogrefe |
| 5,734,254 | A | 3/1998 | Stephens |
| 5,987,244 | A | 11/1999 | Kau |
| 6,122,329 | A | 9/2000 | Zai |
| 6,154,375 | A | 11/2000 | Majid |
| 6,184,651 | B1 | 2/2001 | Fernandez |
| 6,345,203 | B1 | 2/2002 | Mueller |
| 7,336,929 | B2 | 2/2008 | Yasuda |
| 7,791,311 | B2 | 9/2010 | Sagoo |
| 7,847,438 | B2 | 12/2010 | Jin |
| 8,004,235 | B2 | 8/2011 | Baarman |
| 8,041,974 | B2 | 10/2011 | Lin |

(Continued)

FOREIGN PATENT DOCUMENTS

| | | |
|---|---|---|
| CN | 101272063 B | 1/2012 |
| CN | 102315692 A | 1/2012 |

(Continued)

*Primary Examiner* — Rexford Barnie
*Assistant Examiner* — Jagdeep Dhillon
(74) *Attorney, Agent, or Firm* — Winston Hsu; Scott Margo

(57) ABSTRACT

An induction type power supply system with synchronous rectification control for data transmission is disclosed to include a supplying-end module with a supplying-end coil and a receiving-end module with a receiving-end coil for receiving power supply from the supplying-end coil and providing a feedback data signal to the supplying-end coil during power supply transmission subject to the operation of a rectifier and signal feedback circuit of the receiving-end module that breaks off electric current transiently to change the load characteristics of the receiving-end coil, assuring a high level of data signal transmission stability and a high level of power transmission efficiency.

12 Claims, 10 Drawing Sheets

(56) References Cited

U.S. PATENT DOCUMENTS

| | | |
|---|---|---|
| 8,098,043 B2 * | 1/2012 | Lin .................. 320/108 |
| 8,183,827 B2 | 5/2012 | Lyon |
| 8,188,619 B2 | 5/2012 | Azancot |
| 8,217,535 B2 | 7/2012 | Uchida et al. |
| 8,217,621 B2 | 7/2012 | Tsai et al. |
| 8,248,024 B2 | 8/2012 | Yuan et al. |
| 8,358,103 B2 | 1/2013 | Eastlack |
| 8,373,387 B2 | 2/2013 | Bourilkov et al. |
| 8,412,963 B2 | 4/2013 | Tsai et al. |
| 8,417,359 B2 | 4/2013 | Tsai et al. |
| 8,541,975 B2 | 9/2013 | Park et al. |
| 8,772,979 B2 | 7/2014 | Tsai |
| 8,810,072 B2 * | 8/2014 | Tsai et al. .................. 307/104 |
| 2006/0017550 A1 * | 1/2006 | Yoshida et al. ......... 340/426.11 |
| 2007/0177533 A1 | 8/2007 | Palay |
| 2008/0079392 A1 | 4/2008 | Baarman |
| 2008/0231120 A1 | 9/2008 | Jin |
| 2009/0009006 A1 | 1/2009 | Jin |
| 2009/0033294 A1 | 2/2009 | Odajima |
| 2009/0174263 A1 | 7/2009 | Baarman |
| 2009/0267561 A1 | 10/2009 | Lin |
| 2009/0322280 A1 | 12/2009 | Kamijo |
| 2010/0007307 A1 | 1/2010 | Baarman |
| 2010/0279606 A1 | 11/2010 | Hillan |
| 2011/0136550 A1 | 6/2011 | Maugars |
| 2011/0158329 A1 | 6/2011 | Oettinger |
| 2011/0159812 A1 | 6/2011 | Kim |
| 2011/0176589 A1 | 7/2011 | Kolof |
| 2011/0204723 A1 | 8/2011 | Irish |
| 2011/0285212 A1 | 11/2011 | Higuma |
| 2012/0025622 A1 * | 2/2012 | Kim et al. .................. 307/104 |
| 2012/0328061 A1 | 12/2012 | Chow |
| 2013/0234532 A1 | 9/2013 | Fells |

FOREIGN PATENT DOCUMENTS

| | | |
|---|---|---|
| CN | 102710409 A | 10/2012 |
| CN | 103425169 A | 12/2013 |
| TW | M246884 | 10/2004 |
| TW | 200527302 | 8/2005 |
| TW | 201018042 | 5/2010 |
| TW | 201123673 | 7/2011 |
| TW | 201123676 | 7/2011 |
| TW | 201128972 | 8/2011 |
| TW | 201138258 | 11/2011 |
| TW | 201234871 | 8/2012 |
| TW | 201243281 | 11/2012 |
| TW | 201315082 | 4/2013 |

* cited by examiner

INDUCTION TYPE POWER SUPPLY SYSTEM WITH SYNCHRONOUS RECTIFICATION CONTROL FOR DATA TRANSMISSION

BACKGROUND OF THE INVENTION

1. Field of the Invention

The present invention relates to power supply systems and more particularly, to an induction type power supply system with synchronous rectification control for data transmission, which comprises a supplying-end module, and a receiving-end module, which receives power supply from the supplying-end coil and provides a feedback data signal to the supplying-end coil during power supply transmission subject to the operation of a rectifier and signal feedback circuit of the receiving-end module that breaks off electric current transiently to change the load characteristics of the receiving-end coil of the receiving-end module, allowing transmission of the feedback data signal without causing power loss.

2. Description of the Related Art

In an induction type power supply system, the most important technique is to identify the object on the supplying-end coil. The power transmitting operation of the supplying-end of an induction type power supply system is similar to the operation of an electromagnetic induction stove for cooking purpose. Directly emitting electric energy onto a metal object will make the metal object hot, leading to unexpected risk. Technique to identify target by the supplying-end was developed to eliminate the aforesaid problem and has been validated workable. This technique enables the coil at the receiving-end to provide a feedback data signal to the coil at the supplying-end during transmission of power supply from the supplying-end to the receiving-end. However, it is difficult to stabilize the transmission of a feedback data signal from the coil at the receiving-end to the coil at the supplying-end during transmission of power supply from the supplying-end to the receiving-end. The signal carrier under the transmission of a high power will be interfered with various noises. Further, this feedback data signal transmission method is performed subject a frequency modulation control system, the operating frequency of the main carrier is not constant. To solve data signal transmission problem under a high power, a wireless communication channel, such as Bluetooth, RFID or Wi-Fi, may be used with power transmission induction coils. However, the use of an extra wireless communication module greatly increases the cost of the induction type power supply system.

Further, there are some technical problems to transmit data signal through power transmission induction coils. Data signal transmitting and receiving operations through power transmission induction coils are same as the application of RFID technology, i.e., the coil at the supplying-end transmits a main carrier to the coil at the receiving-end, and then a circuit at the receiving-end controls the load at the coil to provide a feedback data signal. Therefore, it is a one-way transmission in conventional induction type power supply designs, i.e., power energy (LC oscillator main carrier) is transmitted by the supplying-end to the receiving-end, and then the receiving-end provides a feedback data code to the supplying-end. The energy received by the receiving-end may vary in strength without any communication component. The transmission of the feedback data code can be done only after the receiving-end has been kept in proximity to the supplying-end to receive sufficient electric energy. When the supplying-end provides no power supply to the receiving-end, the receiving-end cannot provide a feedback data code to the supplying-end. This design is not a complete communication system; however, it is practical in an induction type power supply system to satisfy the functional requirements of the system. Normally, after recognition of the identification of the target, the supplying-end starts to transmit power supply, and makes proper adjustment subject to a feedback signal from the receiving-end.

The power receiving and data feedback architecture at the receiving-end of conventional induction type power supply systems may be a resistive or capacitive type design. In a resistive type design, the modulation of a feedback signal comes from passive RFID techniques. By means of using the impedance switching function of the coil at the receiving-end, the feedback signal is provided to the coil at the supplying-end. Further, to reduce power loss during the transmission of a feedback data signal under a high power environment, capacitive feedback signal modulation technique was created. Either of the aforesaid resistive type and capacitive type designs will increase the power output of the supplying-end during signal modulation, and the power loss will be relatively increased when the number of times of signal modulation or the modulating time is increased. This power loss problem of conventional induction type power supply systems is directly contrary to the basic principle of energy saving of modern products. Further, in the aforesaid designs, a current impact may be produced at the circuits of the receiving-end during signal modulation, causing damage to power converting components or instable power supply.

Therefore, it is desirable to an economic induction type power supply system, which ensures a high level of power supplying stability, facilitating transmission of feedback data signal by the receiving-end to the supplying-end without causing power loss.

SUMMARY OF THE INVENTION

The present invention has been accomplished under the circumstances in view. It is one object of the present invention to provide an induction type power supply system with synchronous rectification control for data transmission, which assures a high level of data signal transmission stability and a high level of power transmission efficiency.

To achieve this and other objects of the present invention, an induction type power supply system with synchronous rectification control for data transmission comprises a supplying-end module and a receiving-end module. The receiving-end module receives power supply from the supplying-end coil, and provides a feedback data signal to the supplying-end coil during power supply transmission subject to the operation of a rectifier and signal feedback circuit of the receiving-end module that breaks off electric current transiently to change the load characteristics of the receiving-end coil, allowing transmission of the feedback data signal without causing power loss.

Further, the receiving-end module comprises a receiving-end microprocessor having installed therein an operation/control software programs, a voltage detection circuit, a rectifier and signal feedback circuit, a protection circuit breaker, a voltage stabilizer circuit, a DC-DC step-down converter, a receiving-end resonant capacitor and a receiving-end coil. The voltage detection circuit, the rectifier and signal feedback circuit, the protection circuit breaker, the voltage stabilizer circuit, the DC-DC step-down converter, the receiving-end resonant capacitor and the receiving-end coil are respectively electrically connected to the receiving-end microprocessor. The rectifier and signal feedback circuit comprises a first resistor, a first MOSFET component, a first diode, a second resistor, a second MOSFET component, a second diode, a third resistor, a third MOSFET component, a fourth resistor, a fourth MOSFET component and a capacitor. The first diode and the second diode are electrically connected in parallel to the voltage detection circuit and then electrically connected to the third resistor and the third MOSFET component through the first resistor and the first MOSFET component. The third MOSFET component is electrically connected to the receiving-end microprocessor, and then electrically connected to the fourth resistor and the fourth MOSFET component via the second resistor and the second MOSFET component. The fourth MOSFET component is electrically connected to the receiving-end microprocessor, the first diode. The second diode is electrically connected in parallel to the capacitor.

Further, during induction between the supplying-end coil of the supplying-end module and the receiving-end coil of the receiving-end module, inducted electric current is transmitted by the supplying-end module to the receiving-end module. At this time, the receiving-end module is regarded as a load, which receives electric current from the supplying-end coil, and the current volume will affect the amplitude of the supplying-end coil. Further, a control switch is designed and installed in the rectifier and signal feedback circuit to break of electric current. By means of switching off the rectifier and signal feedback circuit to disconnect the load from the supplying-end module transiently, the supplying-end coil is controlled to run idle, thereby reducing signal amplitude. During interruption of power transmission, the power of the capacitor at the rear end drops. When the rectifier and signal feedback circuit is switched on again, the capacitor is charged, thereby increasing the amplitude of the supplying-end coil. By means of this effect, the power-supply module can feed back data signal to the supplying-end module without causing a significant power loss. Further, the time period within which the supply of electric energy to the power-supply module is interrupted is very short, no any component will receive an impact current, avoiding component damage.

DETAILED DESCRIPTION OF THE PREFERRED EMBODIMENT

Figure 1:
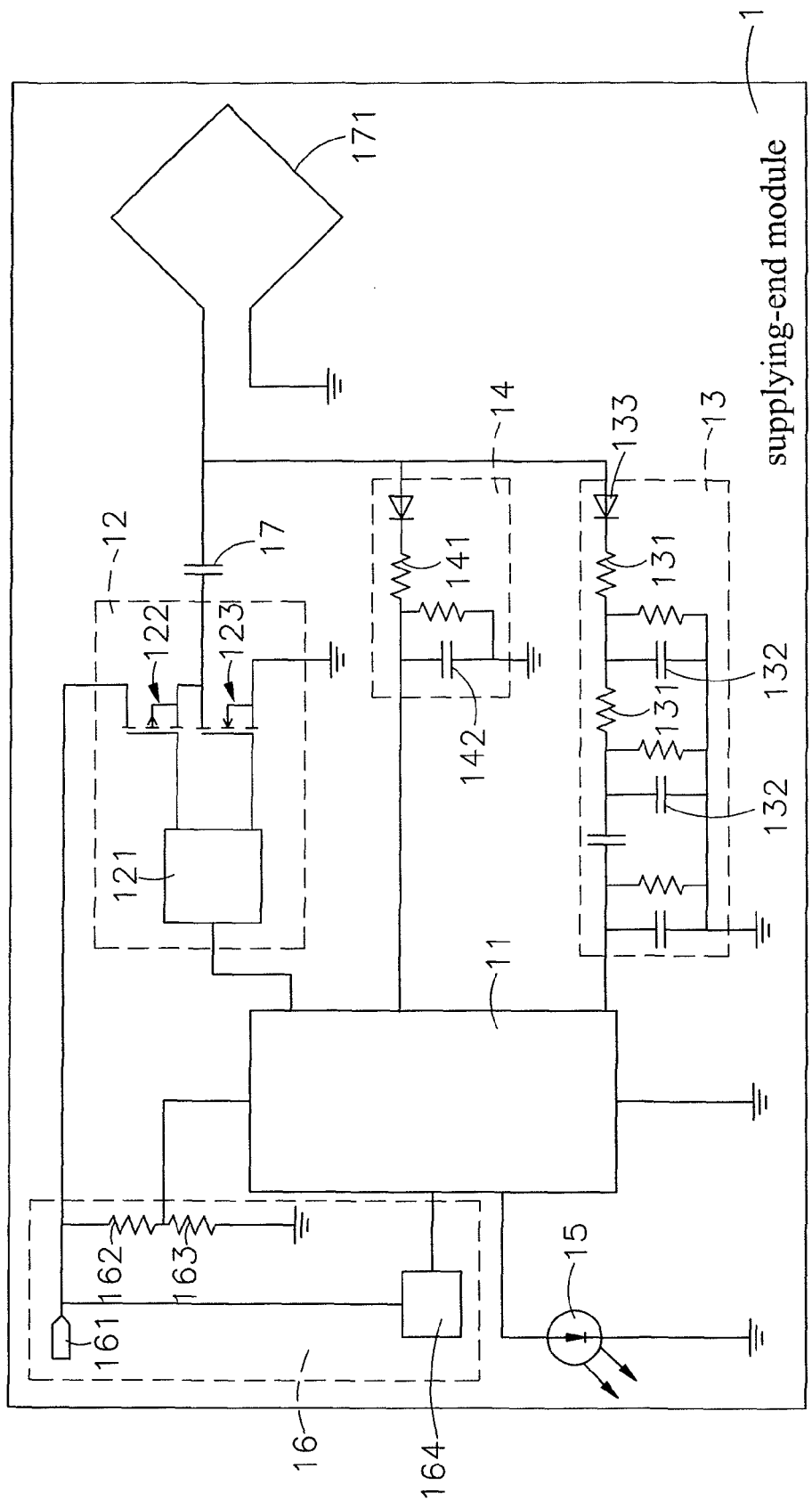
FIG. 1 is a circuit block diagram of a supplying-end module of an induction type power supply system with synchronous rectification control for data transmission in accordance with the present invention.
Figure 2:
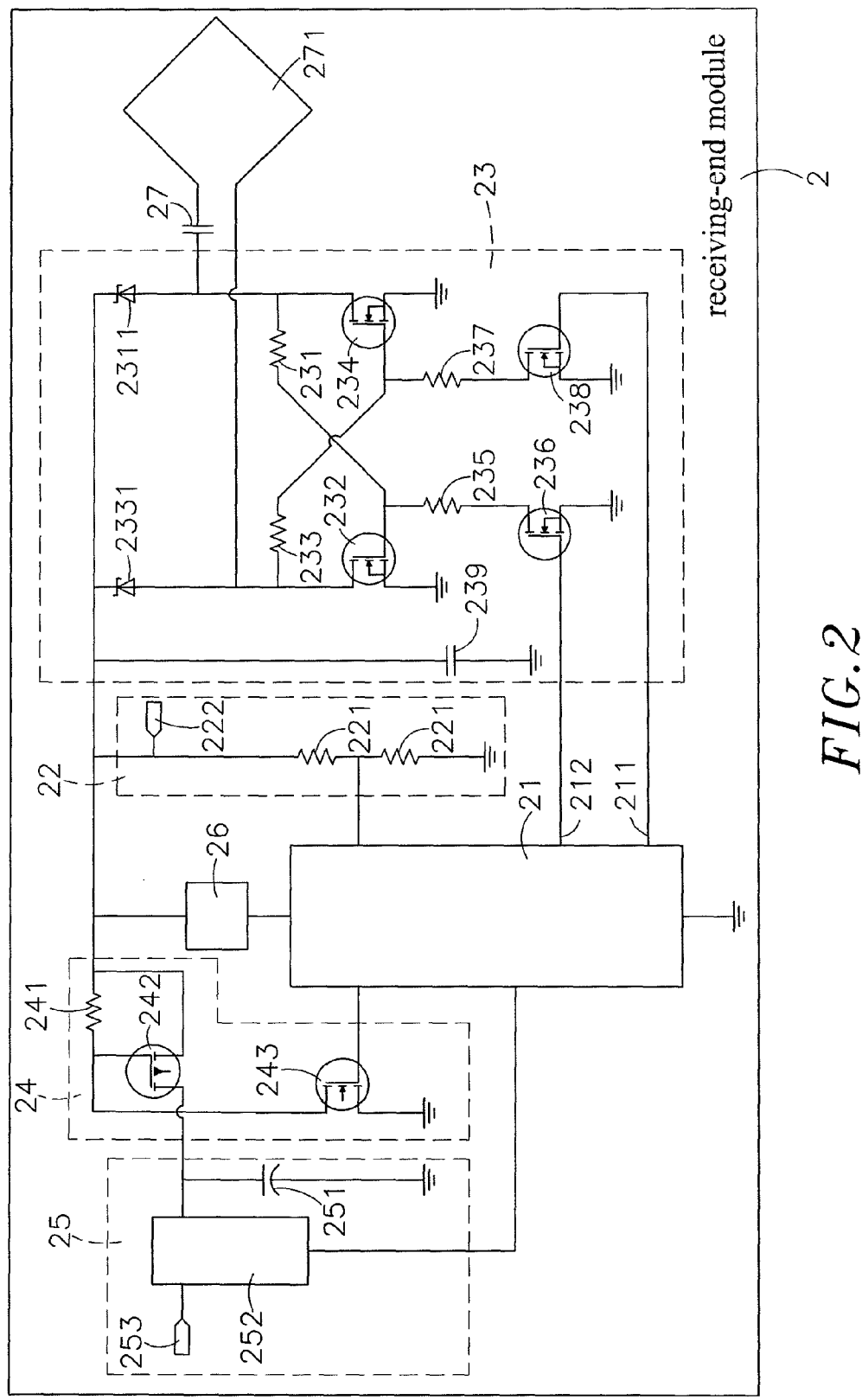
FIG. 2 is a circuit block diagram of a receiving-end module of the induction type power supply system with synchronous rectification control for data transmission in accordance with the present invention.

Referring to FIGS. 1 and 2, an induction type power supply system with synchronous rectification control for data transmission in accordance with the present invention is shown comprising a supplying-end module 1 and a receiving-end module 2.

The supplying-end module 1 comprises a supplying-end microprocessor 11 having installed therein operation/control/anti-noise data processing software programs, a power driver unit 12, a signal processing circuit 13, a coil voltage detection circuit 14, a display unit 15, a power supplying unit 16, a resonant capacitor 17 and a supplying-end coil 171. The power driver unit 12, the signal processing circuit 13, the coil voltage detection circuit 14, the display unit 15 and the power supplying unit 16 are respectively electrically coupled to the supplying-end microprocessor 11. The power driver unit 12 comprises a MOSFET (Metal-Oxide-Semiconductor Field-Effect Transistor) driver 121, a high-end MOSFET component 122 and a low-end MOSFET component 123. The MOSFET driver 121 is electrically coupled with the supplying-end microprocessor 11, the high-end MOSFET component 122 and the low-end MOSFET component 123. The high-end MOSFET component 122 and the low-end MOSFET component 123 are respectively electrically coupled with the resonant capacitor 17. The high-end MOSFET component 122 is also electrically coupled with the power supplying unit 16 and the resonant capacitor 17. The signal processing circuit 13 comprises a rectifier diode 133 electrically coupled with the resonant capacitor 17, resistors 131 electrically connected in series (or in parallel) to the rectifier diode 133, and a plurality of capacitors 132 electrically connected in series to the rectifier diode 133. The coil voltage detection circuit 14 comprises a capacitor 142 and a resistor 141 electrically connected in series to the supplying-end microprocessor 11. The power supplying unit 16 is also electrically coupled with the power driver unit 12, comprising a power source 161, two current sensing shunt resistors 162; 163 electrically connected in series to the power source 161, and a DC-DC step-down converter 164 electrically connected to the power source 161. The supplying-end coil 171 is electrically coupled with the resonant capacitor 17, and adapted for transmitting power supply and receiving data signal wirelessly.

The receiving-end module 2 comprises a receiving-end microprocessor 21 having installed therein operation/control software programs, a voltage detection circuit 22, a rectifier and signal feedback circuit 23, a protection circuit breaker 24, a voltage stabilizer circuit 25, a second DC-DC step-down converter 26, a resonant capacitor 27 and a receiving-end coil 271. The voltage detection circuit 22, the rectifier and signal feedback circuit 23, the protection circuit breaker 24, the voltage stabilizer circuit 25 and the second DC-DC step-down converter 26 are respectively electrically coupled with the receiving-end microprocessor 21. The voltage detection circuit 22 comprises a plurality of resistors 221 electrically connected in series to the receiving-end microprocessor 21, and sensing points 222 electrically connected with the resistors 221, the rectifier and signal feedback circuit 23, the protection circuit breaker 24 and the second DC-DC step-down converter 26 in series. The rectifier and signal feedback circuit 23 comprises a first resistor 231, a first MOSFET component 232, a first diode 2311 and a second resistor 233, a second MOSFET component 234, a second diode 2331, a third resistor 235, a third MOSFET component 236, a fourth resistor 237, a fourth MOSFET component 238, and a capacitor 239. The first diode 2311 and the second diode 2331 are electrically connected in parallel to the voltage detection circuit 22, and then electrically connected to the third resistor 235 and the third MOSFET component 236 through the first resistor 231 and the first MOSFET component 232. The third MOSFET component 236 is electrically connected to a second data signal pin 212 of the receiving-end microprocessor 21, and then electrically connected to the fourth resistor 237 and the fourth MOSFET component 238 via the second resistor 233 and the second MOSFET component 234. The fourth MOSFET component 238 is electrically connected to a first data signal pin 211 of the receiving-end microprocessor 21. The first diode 2311 and the second diode 2331 are also electrically connected in parallel to the capacitor 239. The first resistor 231, the second resistor 233, the first diode 2311 and the second diode 2331 are also electrically connected to the receiving-end coil 271 through the resonant capacitor 27, and also electrically connected to the voltage detection circuit 22. The protection circuit breaker 24 comprises a resistor 241, a P-type MOSFET component 242 and an N-type MOSFET component 243. The resistor 241, the P-type MOSFET component 242 and the N-type MOSFET component 243 are electrically connected in series. Further, the N-type MOSFET component 243 is electrically coupled with the receiving-end microprocessor 21. The voltage stabilizer circuit 25 comprises a buffer capacitor 251, a first DC-DC step-down converter 252 and a power output terminal 253. The P-type MOSFET component 242 is electrically connected with the buffer capacitor 251 and first DC-DC step-down converter 252 of the voltage stabilizer circuit 25. The first DC-DC step-down converter 252 is electrically connected to the power output terminal 253. The voltage detection circuit 22, the protection circuit breaker 24, the voltage stabilizer circuit 25 and the second DC-DC step-down converter 26 are respectively electrically connected to the receiving-end microprocessor 21. The voltage detection circuit 22, the protection circuit breaker 24 and the second DC-DC step-down converter 26 are also respectively electrically connected to the rectifier and signal feedback circuit 23. The first diode 2311 and second diode 2331 of the rectifier and signal feedback circuit 23 are also electrically connected to the receiving-end coil 271 through the resonant capacitor 27.

By means of the supplying-end coil 171 of the supplying-end module 1 and the receiving-end coil 271 of the receiving-end module 2, the receiving-end module 2 can provide a feedback data signal to the supplying-end module 1 during transmission of electric energy, and the watt level of the electric energy under transmission will not affect signal transmission stability. During induction between the supplying-end coil 171 of the supplying-end module 1 and the receiving-end coil 271 of the receiving-end module 2, induced electric current is transmitted by the supplying-end module 1 to the receiving-end module 2. At this time, the receiving-end module 2 is regarded as a load, which receives electric current from the supplying-end coil 171, and the current volume will affect the amplitude of the supplying-end coil 171. A control switch is designed and installed in the rectifier and signal feedback circuit 23 for switching the rectifier and signal feedback circuit 23 to disconnect the first data signal pin 211 and second data signal pin 212 of the receiving-end microprocessor 21 subject to the control of the third MOSFET component 236 and the fourth MOSFET component 238. By means of switching off the rectifier and signal feedback circuit 23 to disconnect the load from the supplying-end module 1 for a very short time period, the supplying-end coil 171 is controlled to run idle, thereby reducing signal amplitude. During interruption of power transmission, the power of the capacitor 239 drops. When the rectifier and signal feedback circuit 23 is switched on again, the capacitor 239 receives much electric current subject to a charging effect, thereby increasing the amplitude of the supplying-end coil 171. By means of this effect, the receiving-end module 2 can feed back data signal to the supplying-end module 1 without causing a significant power loss. Further, the time period within which the supply of electric energy to the receiving-end module 2 is interrupted is very short, no any component will receive an impact current, avoiding component damage.

Figure 3:
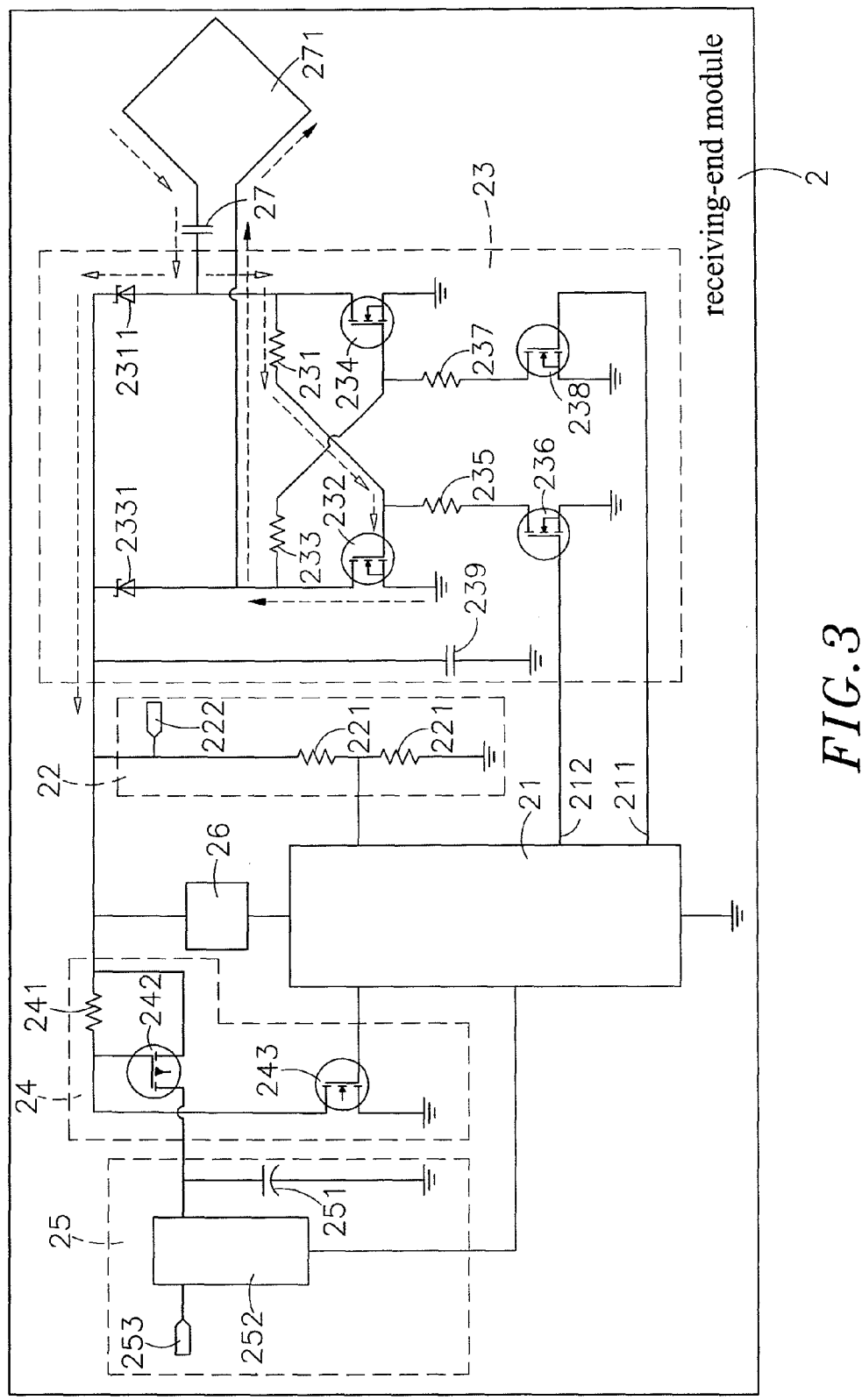
FIG. 3 is a circuit block diagram of the present invention, illustrating an operation status of the receiving-end module of the induction type power supply system.
Figure 4:
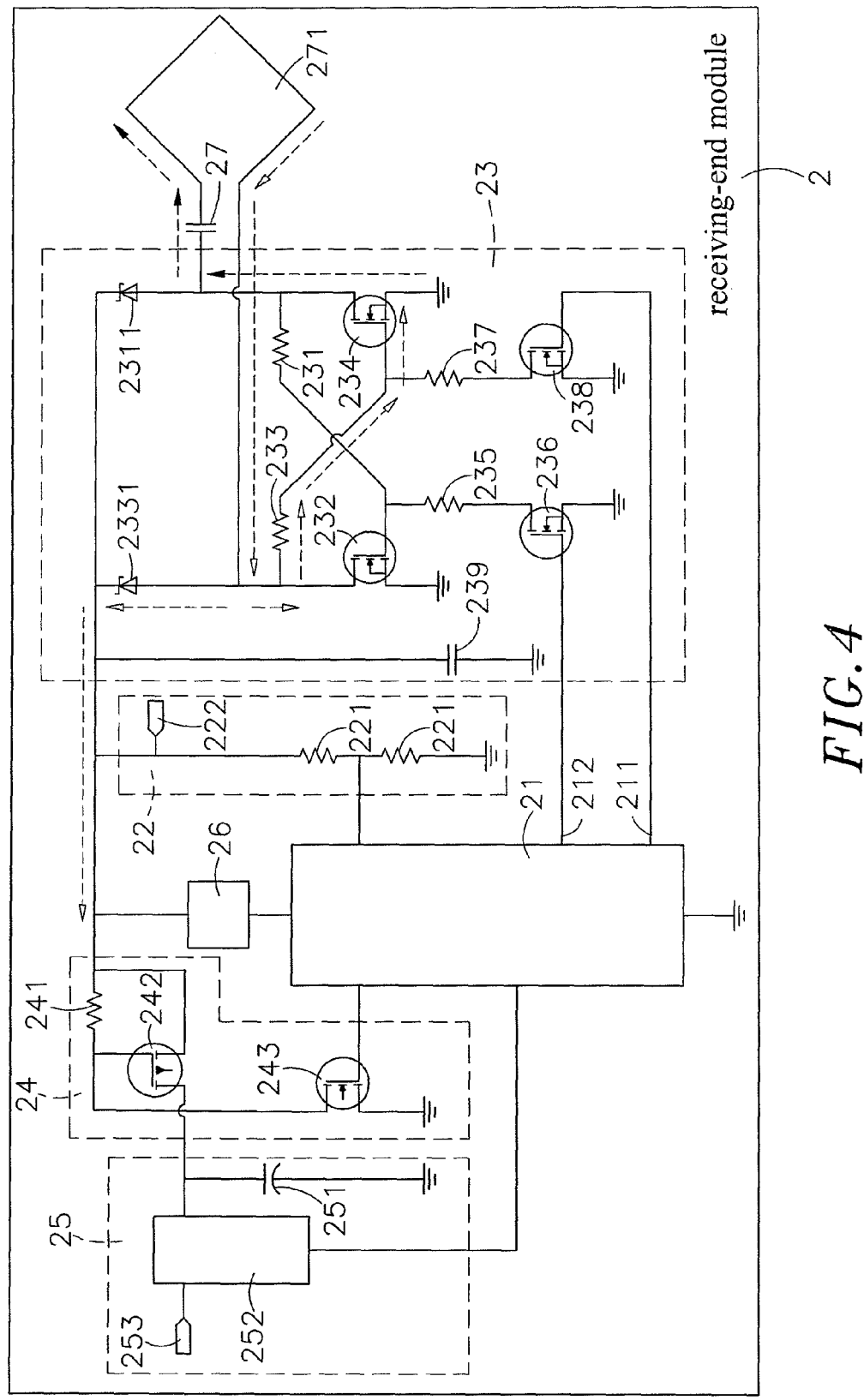
FIG. 4 is a circuit block diagram of the present invention, illustrating another operation status of the receiving-end module of the induction type power supply system.

Referring to FIGS. 3 and 4 and FIGS. 1 and 2 again, by means of half-bridge synchronous rectification, the first diode 2311 and the second diode 2331 work with the first MOSFET component 232 and the second MOSFET component 2334 to perform rectification operation. These two N-pass MOSFETs at the low-end can lower pass loss without using any additional integrated circuit to perform control. Further, the combination of the power loss due to a difference in forward voltage between the first diode 2311 and the second diode 2331 upon passing of electric current therethrough in one full cycle and the resistive loss upon passing of electric current through the first MOSFET component 232 and the second MOSFET component 234 is about one half of the total power loss of a conventional design using four diodes to perform rectification. Further, the third MOSFET component 236 and the fourth MOSFET component 238 are used in the rectifier and signal feedback circuit 23 to work as switch means to control the operation of synchronous rectification of the rectifier and signal feedback circuit 23. When the receiving-end module 2 is receiving power supply from the supplying-end module 1, the third MOSFET component 236 and the fourth MOSFET component 238 are in open loop without affecting the operation of synchronous rectification of the rectifier and signal feedback circuit 23.

Referring to FIGS. 1-4 again, the first data signal pin 211 and second data signal pin 212 of the receiving-end microprocessor 21 of the receiving-end module 2 are maintained at a low potential, so that the third MOSFET component 236 and the fourth MOSFET component 238 are maintained in open loop. During the positive half cycle when the receiving-end coil 271 of the receiving-end module 2 is receiving power supply from the supplying-end coil 171 of the supplying-end module 1, positive current enters the receiving-end coil 271 and then goes through the resonant capacitor 27 (see FIG. 3). At this time, the positive current loop goes in proper order through the first diode 2311, the voltage detection circuit 22 and the protection circuit breaker 24 to the power output terminal 253 of the voltage stabilizer circuit 25, and the high potential generated by the receiving-end coil 271 during the positive half cycle goes through the first resistor 231 to the gate G of the first MOSFET component 232 toward the receiving-end coil 271 via the grounding terminal of the first MOSFET component 232, thereby forming a complete power supply loop.

Further, during the negative half cycle when the receiving-end coil 271 of the receiving-end module 2 is receiving power supply from the supplying-end coil 171 of the supplying-end module 1, positive current enters the receiving-end coil 271 (see FIG. 4). At this time, the positive current loop goes in proper order through the second diode 2331, the voltage detection circuit 22 and the protection circuit breaker 24 to the power output terminal 253 of the voltage stabilizer circuit 25, and the high potential generated by the receiving-end coil 271 during the negative half cycle goes through the second resistor 233 to the gate G of the second MOSFET component 234 toward the receiving-end coil 271 via the grounding terminal of the second MOSFET component 234, thereby forming a complete power supply loop. FIGS. 3 and 4 explain the power supplying operation during induction where the rectifier and signal feedback circuit 23 gives no feedback.

Figure 5:
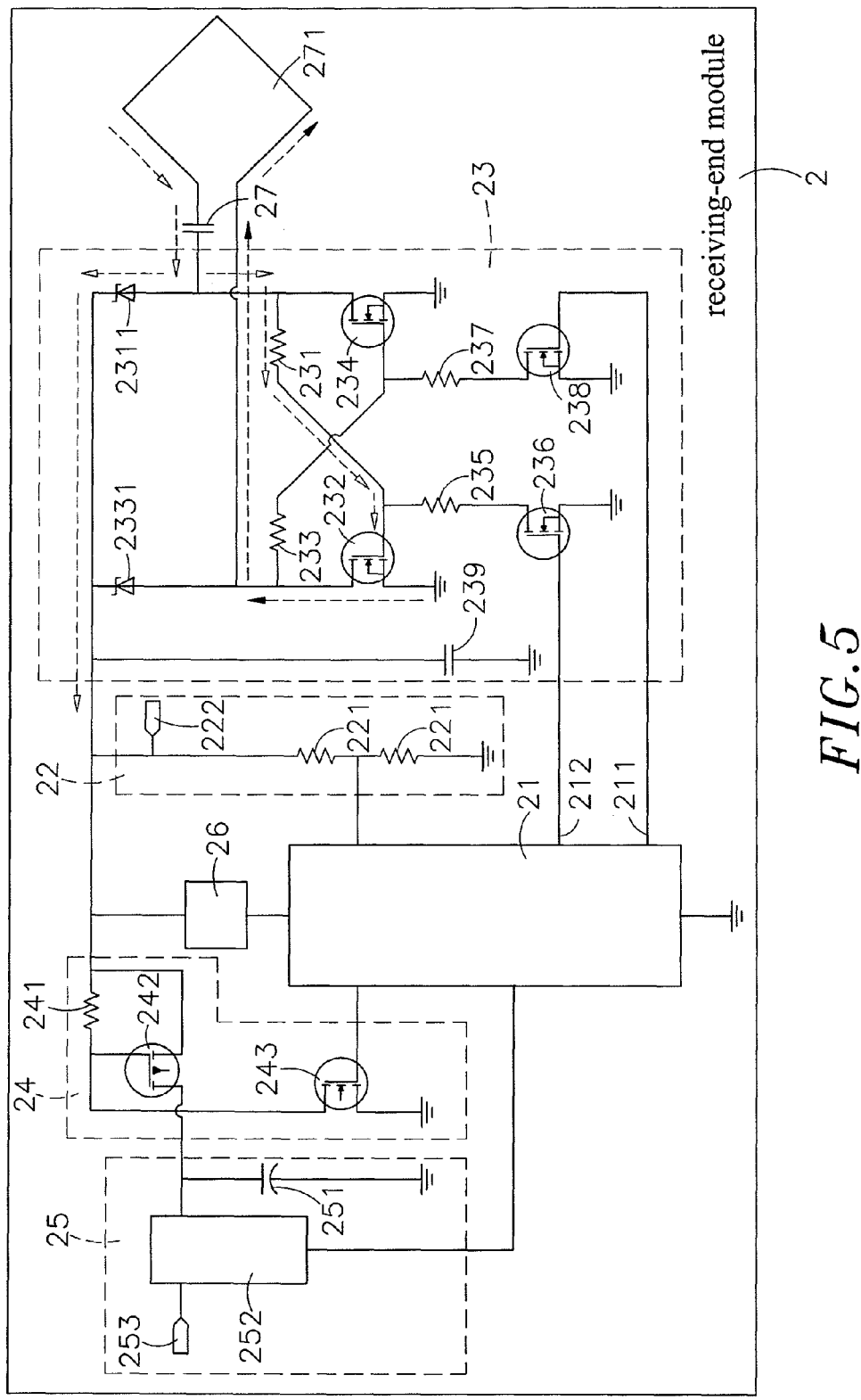
FIG. 5 is a circuit block diagram of the present invention, illustrating still another operation status of the receiving-end module of the induction type power supply system.
Figure 6:
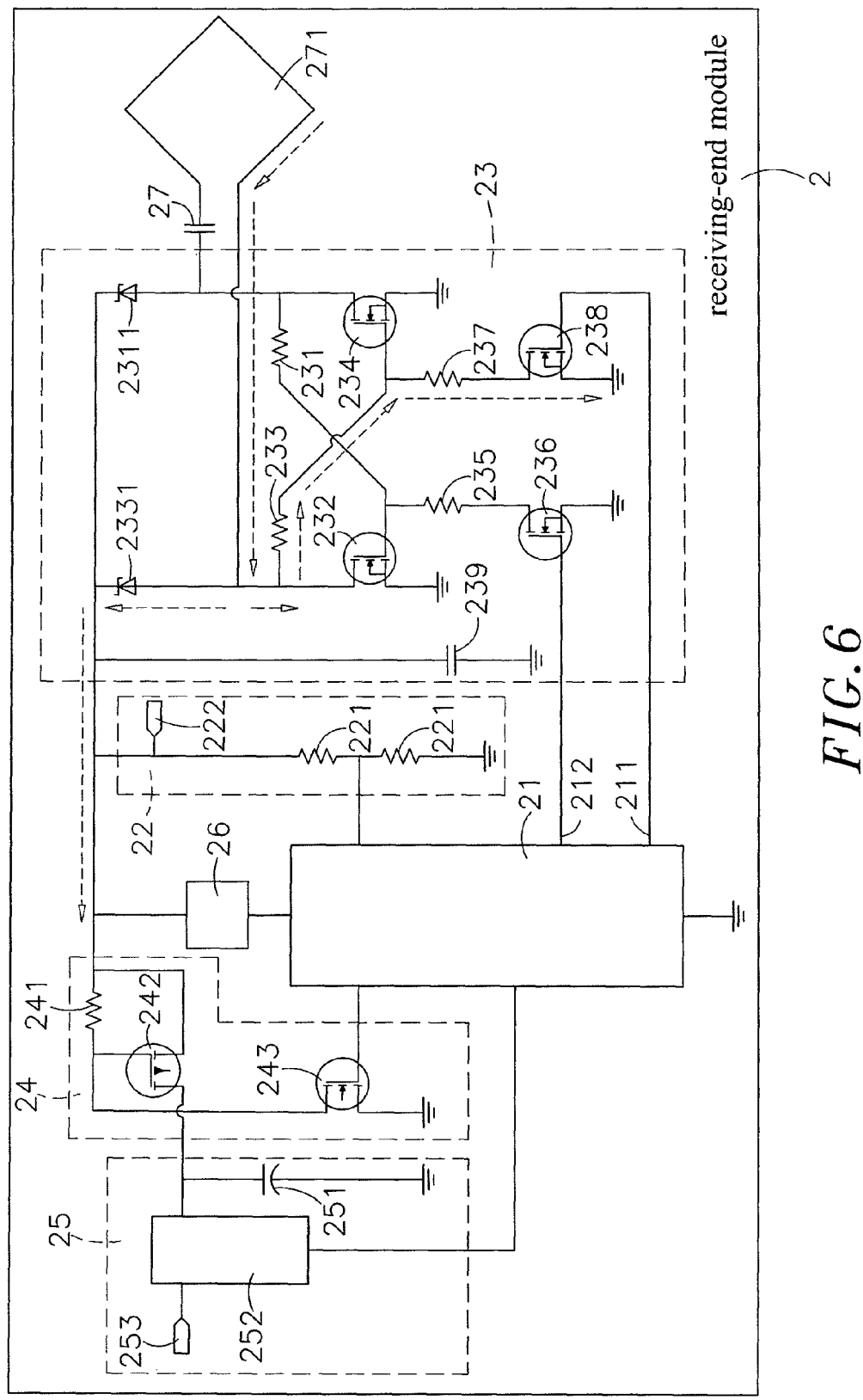
FIG. 6 is a circuit block diagram of the present invention, illustrating still another operation status of the receiving-end module of the induction type power supply system.

Referring to FIGS. 5 and 6 and FIGS. 1 and 2 again, when the rectifier and signal feedback circuit 23 of the receiving-end module 2 modulates a half-wave feedback data signal, the receiving-end microprocessor 21 sets the output of the first data signal pin 211 to be at a high potential (normally, it is the 5V working voltage of the receiving-end microprocessor 21), and this output is inputted into the gate G of the fourth MOSFET component 238 to electrically conduct the fourth MOSFET component 238 while the gate G of the second MOSFET component 234 is maintained at a low potential. Further, the output of the second data signal pin 212 is maintained at a low potential, which is inputted into the gate G of the third MOSFET component 236, keeping the third MOSFET component 236 in open loop. During the positive half cycle when the receiving-end coil 271 of the receiving-end module 2 is receiving power supply from the supplying-end coil 171 of the supplying-end module 1, positive current enters the receiving-end coil 271 and then goes through the resonant capacitor 27 (see FIG. 5). At this time, the positive current loop goes in proper order through the first diode 2311, the voltage detection circuit 22 and the protection circuit breaker 24 to the power output terminal 253 of the voltage stabilizer circuit 25, and the high potential generated by the receiving-end coil 271 during the positive half cycle goes through the first resistor 231 to the gate G of the first MOSFET component 232 toward the receiving-end coil 271 via the grounding terminal of the first MOSFET component 232, thereby forming a complete power supply loop.

Further, during the negative half cycle when the receiving-end coil 271 of the receiving-end module 2 is receiving power supply from the supplying-end coil 171 of the supplying-end module 1, positive current enters the receiving-end coil 271 (see FIG. 6), and the high potential generated by the receiving-end coil 271 during the negative half cycle goes through the second resistor 233 to the gate G of the second MOSFET component 234. Under this control status, the fourth MOSFET component 238 is conducted, and the second MOSFET component 234 is kept in open loop, and therefore the grounding current is not conducted, avoiding supplying of power supply to the power output terminal 253. At this time, the receiving-end module 2 receives only one half of the energy of normal supplying of power supply. FIGS. 5 and 6 explain the power supplying operation during induction where the rectifier and signal feedback circuit 23 modulates a half-wave feedback data signal.

Figure 7:
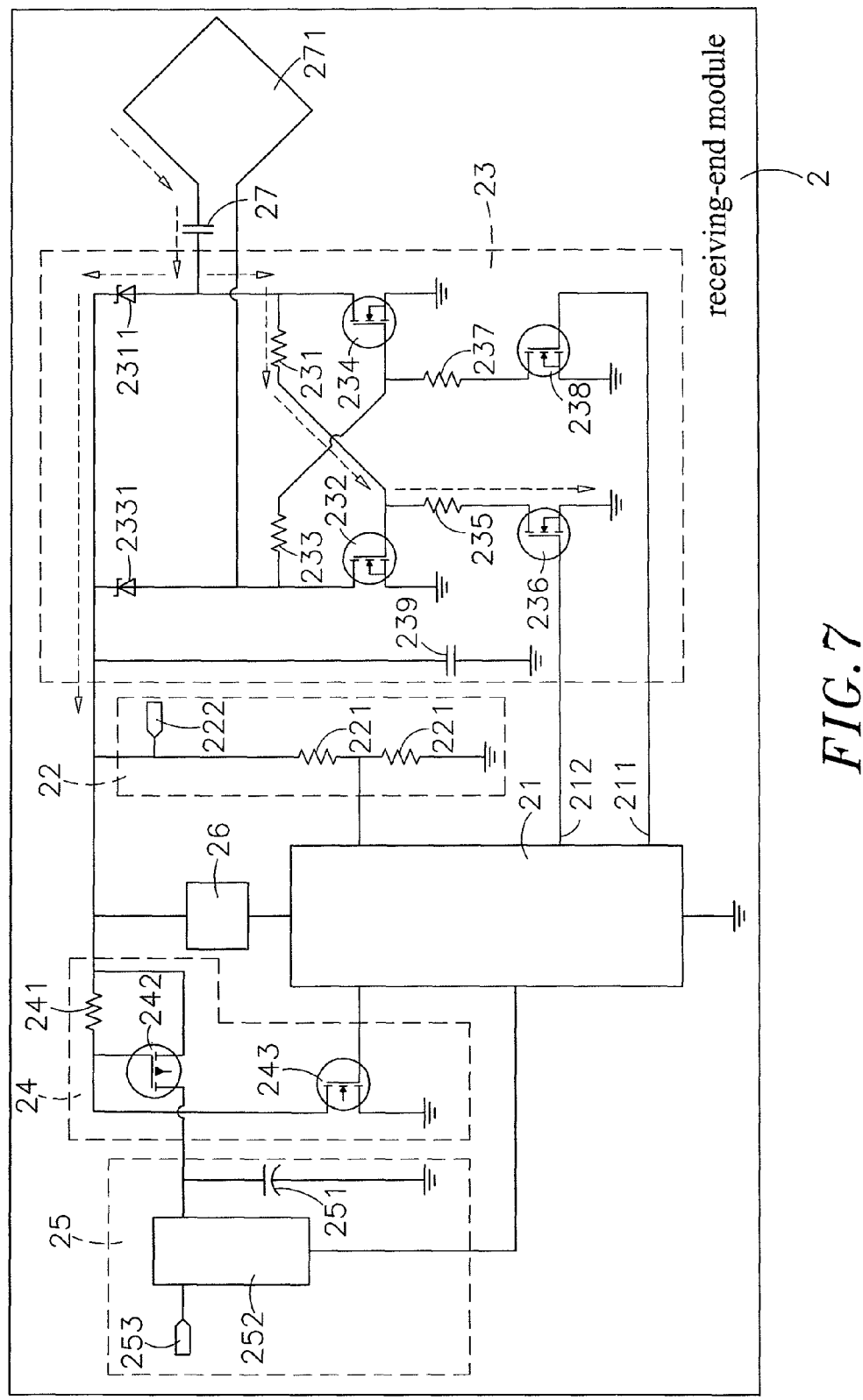
FIG. 7 is a circuit block diagram of the present invention, illustrating still another operation status of the receiving-end module of the induction type power supply system.
Figure 8:
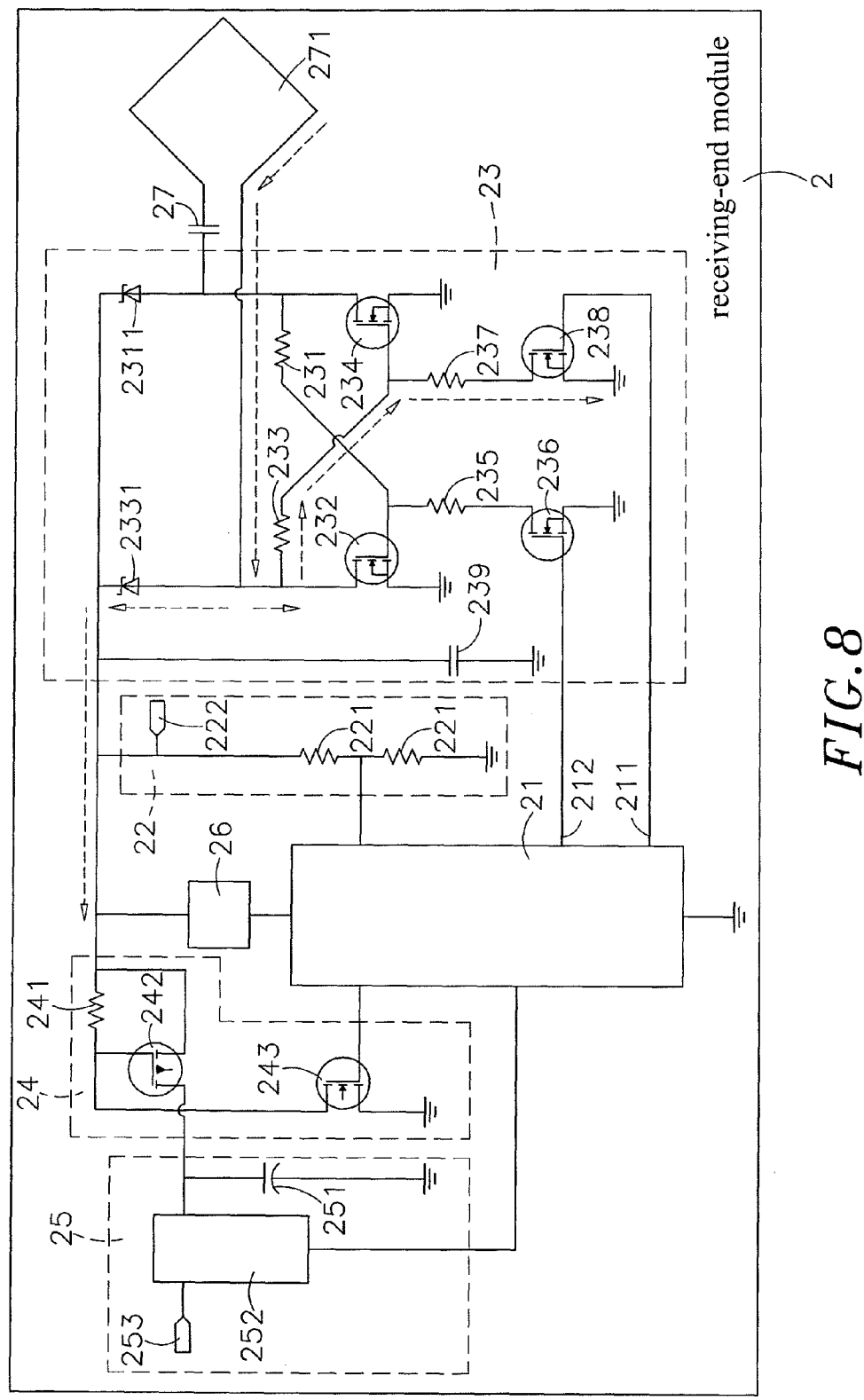
FIG. 8 is a circuit block diagram of the present invention, illustrating still another operation status of the receiving-end module of the induction type power supply system.

Referring to FIGS. 7 and 8 and FIGS. 1 and 2 again, when the rectifier and signal feedback circuit 23 of the receiving-end module 2 modulates a full-wave feedback data signal, the receiving-end microprocessor 21 sets the output of the first data signal pin 211 to be at a high potential (normally, it is the 5V working voltage of the receiving-end microprocessor 21), and this output is provided to the third MOSFET component 236 and the fourth MOSFET component 238 to electrically conduct these two MOSFET components while the gates G of the first MOSFET component 232 second MOSFET component 234 are maintained at a low potential. During the positive half cycle and negative half cycle when the receiving-end coil 271 of the receiving-end module 2 is receiving power supply from the supplying-end coil 171 of the supplying-end module 1, positive current entering the receiving-end coil 271 cannot constitute a power supplying loop. At this time, the supplying-end coil 171 receives no load from the receiving-end coil 271, and the receiving-end coil 271 does not get power supply from the supplying-end coil 171. FIGS. 7 and 8 explain the power supplying operation during induction where the rectifier and signal feedback circuit 23 modulates a full-wave feedback data signal.

Figure 9:
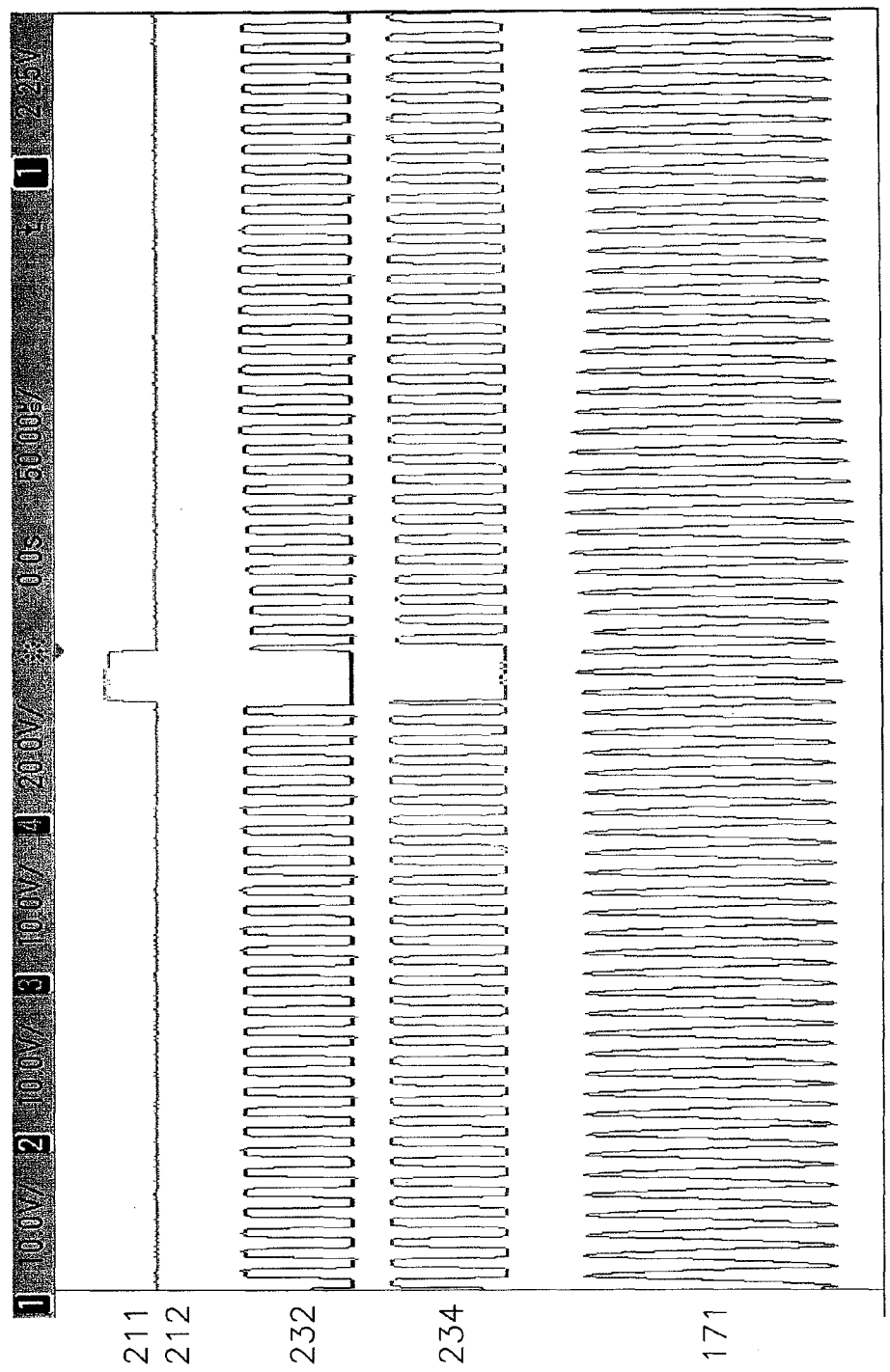
FIG. 9 is a waveform diagram of a modulated full-wave feedback data signal according to the present invention.
Figure 10:
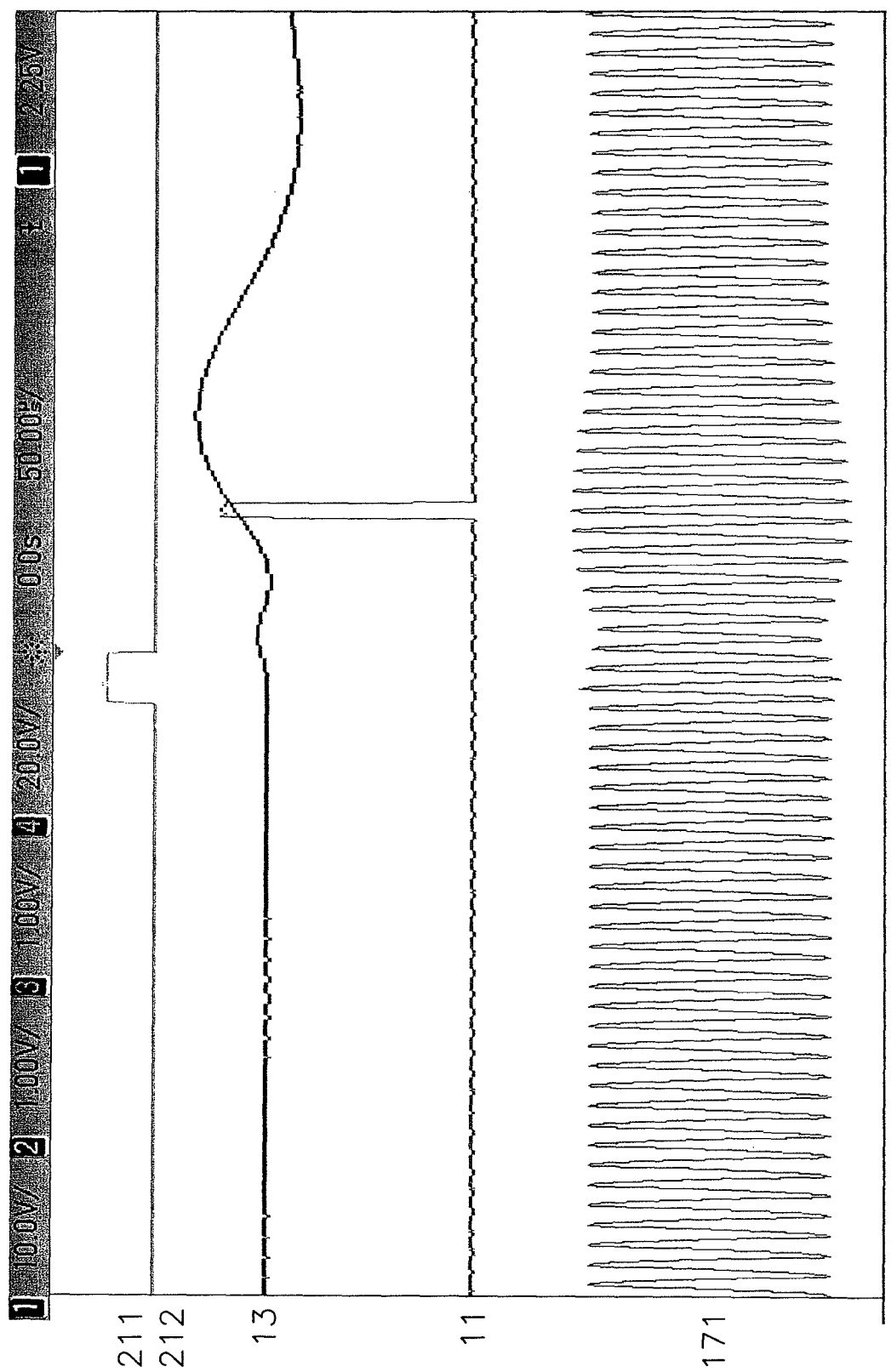
FIG. 10 is a waveform diagram of a demodulated feedback data signal according to the present invention.

Referring to FIGS. 9 and 10 and FIGS. 1 and 2 again, the first MOSFET component 232 and second MOSFET component 234 of the rectifier and signal feedback circuit 23 of the receiving-end module 2 constitute a synchronous rectification circuit, which enables the gates G of the first MOSFET component 232 and second MOSFET component 234 to be maintained at a low potential when the first data signal pin 211 and second data signal pin 212 of the receiving-end microprocessor 21 are at a low potential. At the instant when the circuit becomes open (see FIGS. 4, 7 and 8), the amplitude of the supplying-end coil 171 of the supplying-end module 1 is slightly lowered. When the synchronous rectification circuit of the first MOSFET component 232 and second MOSFET component 234 is electrically conducted, the early interruption of the transmission of power supply causes the power at the capacitor 239 to be lowered. When the rectifier and signal feedback circuit 23 is conducted, the capacitor 239 is electrically charged, thereby increasing the amplitude of the supplying-end coil 171. By using this effect, the receiving-end coil 271 can provide a feedback data signal to the supplying-end coil 171 without causing any power loss. Thus, power conversion efficiency between the supplying-end coil 171 and the receiving-end coil 271 is enhanced. Further, when the rectifier and signal feedback circuit 23 is modulating a feedback data signal, the amplitude of the supplying-end coil 171 is shrunk and then enlarged, facilitating identification of e feedback data signal by the supplying-end microprocessor 11, enhancing transmission stability of the data code of the feedback data signal, and improving power transmission efficiency. FIG. 10 explains a change in amplitude after the signal at the supplying-end coil 171 is processed by the signal processing circuit 13. This data signal is then provided to the supplying-end microprocessor 11, and then processed through an anti-noise signal processing software, and thus the data signal receiving operation is done.

As stated above, during operation of the induction type power supply system of the present invention, the supplying-end microprocessor 11 of the supplying-end module 1 controls the supplying-end coil 171 to provide power supply to the receiving-end coil 271 of the receiving-end module 2 by means of induction, and the third MOSFET component 236 and the fourth MOSFET component 238 of the rectifier and signal feedback circuit 23 break off the rectifier and signal feedback circuit 23 transiently to change the load characteristics of the receiving-end coil 271, allowing the receiving-end coil 271 to feed back a data signal to the supplying-end coil 171 for easy identification by the supplying-end microprocessor 11. By means of the functioning of the rectifier and signal feedback circuit 23 to break off electric current transiently for allowing transmission of a feedback data signal, the invention enhances data signal transmission stability and power transmission efficiency without causing power loss.

In actual practice, the induction type power supply system of the present invention has advantages as follows:

1. During transmission of power supply between the supplying-end coil 171 of the supplying-end module 1 and the receiving-end coil 271 of the receiving-end module 2, the rectifier and signal feedback circuit 23 of the receiving-end module 2 breaks off electric current transiently to change the load characteristics of the receiving-end coil 271 for allowing the receiving-end coil 271 to provide a feedback data signal to the supplying-end coil 171 for easy identification by the supplying-end microprocessor 11, assuring a high level of data signal transmission stability and a high level of power transmission efficiency.

2. During the period the receiving-end coil 271 modulates a feedback data signal to the supplying-end coil 171, transmission of power supply by the supplying-end coil 171 to the receiving-end coil 271 does not cause any extra power loss, and therefore, power conversion efficiency between the supplying-end coil 171 and the receiving-end coil 271 is enhanced.

A prototype of induction type power supply system with synchronous rectification control for data transmission has been constructed with the features of FIGS. 1-10. The induction type power supply system with synchronous rectification control for data transmission works smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An induction type power supply system, comprising a supplying-end module and a receiving-end module, said supplying-end module comprising a supplying-end microprocessor having installed therein operation/control/anti-noise data processing software programs, a power driver unit, a signal processing circuit, a coil voltage detection circuit, a display unit, a power supplying unit, a supplying-end resonant capacitor and a supplying-end coil, said power driver unit, said signal processing circuit, said coil voltage detection circuit, said display unit and said power supplying unit being respectively electrically coupled to said supplying-end microprocessor, said supplying-end coil being electrically coupled with said supplying-end resonant capacitor and adapted for transmitting power supply and data signal wirelessly, said receiving-end module comprising a receiving-end coil for receiving power supply from said supplying-end coil and transmitting data signals to said supplying-end coil wirelessly, wherein: said receiving-end module comprises a receiving-end microprocessor having installed therein an operation/control software programs, a voltage detection circuit, a rectifier and signal feedback circuit, a protection circuit breaker, a voltage stabilizer circuit, a DC-DC step-down converter, a receiving-end resonant capacitor and said receiving-end coil, said voltage detection circuit, said rectifier and signal feedback circuit, said protection circuit breaker, said voltage stabilizer circuit, said DC-DC step-down converter, said receiving-end resonant capacitor and said receiving-end coil being respectively electrically coupled with said receiving-end microprocessor, said rectifier and signal feedback circuit comprising a first resistor, a first MOSFET component, a first diode, a second resistor, a second MOSFET component, a second diode, a third resistor, a third MOSFET component, a fourth resistor, a fourth MOSFET component and a capacitor, said first diode and said second diode being electrically connected in parallel to said voltage detection circuit and then electrically connected to said third resistor and said third MOSFET component through said first resistor and said first MOSFET component, said third MOSFET component being electrically connected to said receiving-end microprocessor and then electrically connected to said fourth resistor and said fourth MOSFET component via said second resistor and said second MOSFET component, said fourth MOSFET component being electrically connected to said receiving-end microprocessor, said first diode and said second diode being electrically connected in parallel to said capacitor.

2. The induction type power supply system as claimed in claim 1, wherein said first resistor, said second resistor, said first diode and said second diode of said receiving-end module are electrically connected in parallel to said capacitor and then electrically connected to said receiving-end resonant capacitor and said receiving-end coil through said voltage detection circuit.

3. The induction type power supply system as claimed in claim 1, wherein said third MOSFET component is respectively electrically connected to a second data signal pin of said receiving-end microprocessor; said fourth MOSFET component is electrically connected to a first data signal pin of said receiving-end microprocessor.

4. The induction type power supply system as claimed in claim 1, wherein said first MOSFET component and said second MOSFET component are rectifiers of N-pass MOSFET components; said third MOSFET component and said fourth MOSFET component are N-pass switching devices.

5. The induction type power supply system as claimed in claim 1, wherein said supplying-end microprocessor of said supplying-end module is electrically coupled with said power driver unit, said signal processing circuit, said coil voltage detection circuit, said display unit and said power supplying unit, and electrically connected to said supplying-end resonant capacitor and said supplying-end coil through said power driver unit.

6. The induction type power supply system as claimed in claim 5, wherein said power driver comprises a MOSFET driver, a high-end MOSFET component and a low-end MOSFET component, said MOSFET driver being electrically coupled with said supplying-end microprocessor, said high-end MOSFET component and said low-end MOSFET component, said high-end MOSFET component and said low-end MOSFET component being respectively electrically coupled with said supplying-end resonant capacitor, said high-end MOSFET component being also electrically coupled with said power supplying unit and said resonant capacitor of said supplying-end module.

7. The induction type power supply system as claimed in claim 5, wherein said signal processing circuit comprises at least one resistor, at least one capacitor, and at least one rectifier diode.

8. The induction type power supply system as claimed in claim 7, wherein said at least one resistor and said at least one capacitor of said signal processing circuit are electrically connected in series.

9. The induction type power supply system as claimed in claim 7, wherein said at least one resistor and said at least one capacitor of said signal processing circuit are electrically connected in parallel.

10. The induction type power supply system as claimed in claim 5, wherein said coil voltage detection circuit comprises a capacitor and a resistor electrically connected in series to said supplying-end microprocessor.

11. The induction type power supply system as claimed in claim 5, wherein said power supplying unit comprises a power source, two current sensing shunt resistors electrically connected in series to said power source, and a DC-DC step-down converter electrically connected to said power source.

12. The induction type power supply system as claimed in claim 5, wherein said receiving-end module is selectively controllable to provide a full-wave feedback signal and a half-wave feedback signal.

* * * * *